United States Patent [19]

Wakita et al.

[11] Patent Number: 5,151,803
[45] Date of Patent: Sep. 29, 1992

[54] PIXEL-GAP CONTROLLED FERROELECTRIC LIQUID CRYSTAL DISPLAY DEVICE AND ITS DRIVING METHOD

[75] Inventors: Naohide Wakita, Osaka; Yoshio Iwai, Takatsuki; Tsuyoshi Uemura, Kadoma; Hiroyuki Ohnishi, Ikeda; Kazuhiro Johten, Hirakata; Satoshi Kimura, Osaka; Shozo Fujiwara, Ibaraki, all of Japan

[73] Assignee: Matsushita Electric Industrial Co., Ltd., Osaka, Japan

[21] Appl. No.: 460,555

[22] Filed: Jan. 3, 1990

[30] Foreign Application Priority Data

Jan. 9, 1989 [JP] Japan ................................. 1-2422
May 26, 1989 [JP] Japan ................................. 1-133442

[51] Int. Cl.⁵ ........................ G02F 1/133; G09G 3/36
[52] U.S. Cl. ........................ 359/56; 359/75; 359/85; 359/100; 340/784
[58] Field of Search ............ 350/332, 333, 350 S, 350/341, 339 R; 340/784, 805

[56] References Cited

U.S. PATENT DOCUMENTS

| | | | |
|---|---|---|---|
| 4,712,872 | 12/1987 | Kanbe et al. | 350/333 |
| 4,770,501 | 9/1988 | Tamura et al. | 359/56 |
| 4,836,657 | 6/1990 | Gunji et al. | 350/333 |
| 4,846,560 | 7/1990 | Tsuboyama et al. | 350/350 S |
| 4,901,066 | 2/1990 | Kobayashi et al. | 350/350 S |
| 4,904,057 | 2/1990 | Sakayori et al. | 350/350 S |
| 4,904,064 | 2/1990 | Lagerwall et al. | 350/350 S |
| 5,011,269 | 4/1991 | Wakita et al. | 350/350 S |

FOREIGN PATENT DOCUMENTS

| | | | |
|---|---|---|---|
| 0179721 | 9/1985 | Japan | 350/350 S |
| 0269124 | 11/1986 | Japan | 350/350 S |
| 0295531 | 12/1986 | Japan | 350/350 S |
| 0102227 | 5/1987 | Japan | 350/344 |
| 0065424 | 3/1988 | Japan | 350/350 S |
| 63-225224 | 9/1988 | Japan | |
| 63-228130 | 9/1988 | Japan | |

OTHER PUBLICATIONS

"Large-Area Video-Rate Multicolor Ferroelectric Liquid-Crystal Display", S. Matsumoto et al., SID 88 Digest, 1988, pp. 41-44.

"Structures and Applications of SSFLC Devices", N. A. Clark et al., Japan Display, 1986, pp. 456-458.

"Black and White FLC TV Panel With Grey Levels", T. Leroux et al., 1988 International Display Research Conference, IEEE 1988, pp. 111-113.

Primary Examiner—Stanley D. Miller
Assistant Examiner—Tai Van Duong
Attorney, Agent, or Firm—Wenderoth, Lind & Ponack

[57] ABSTRACT

A liquid crystal display device and its driving method of the present invention have a voltage application scheme to control a stable condition of a gap between pixels, by applying a voltage to a liquid crystal panel in which ferroelectric liquid crystal is sandwiched between substrates each having a plurality of electrodes. It is possible to implement the black matrix conditions with a simple configuration without a light shielding layer by controlling the stable condition of the gap, to display a grey tone with a combination of pixels and a gap, or to raise the opening ratio by making the condition between adjacent pixels and a gap the same condition.

12 Claims, 10 Drawing Sheets

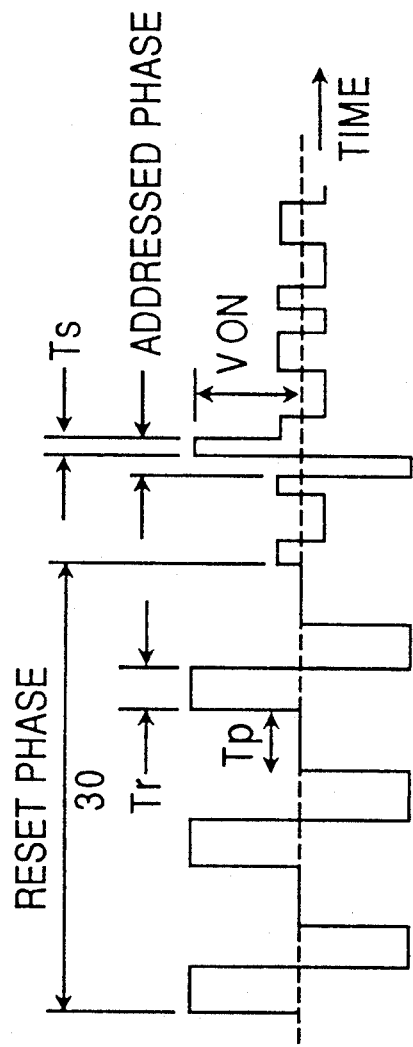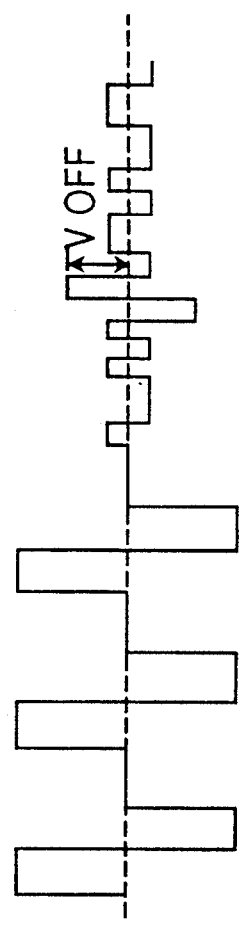
FIG. 5 (a)
FIG. 5 (b)

PIXEL-GAP CONTROLLED FERROELECTRIC LIQUID CRYSTAL DISPLAY DEVICE AND ITS DRIVING METHOD

BACKGROUND OF THE INVENTION

1. Field of the Invention

The present invention relates to a liquid crystal display device having a ferroelectric liquid crystal layer, particularly to an liquid cyrstal display device having a fine pattern of fine pixel pitches and narrow gaps between pixels and its driving method.

2. Prior Art

Ferroelectric liquid crystal has been attracted attention as a new liquid crystal device which has spontaneous polarization with a presponse time of a microsecond order with a memory feature in a thin layer cell. The configuration of the conventional ferroelectric liquid crystal element is that a ferroelectric liquid crystal is sandwiched between two substrates each having a pattern of stripe-shaped transparent electrodes formed on a glass and two an alignment layer formed on the electrode pattern. The substrates are disposed such that the electrode patterns are in a perpendicular relation to each other. The alignment layer is a high polymer having been rubbed or an obliquely deposited inorganic material layer such as SiO. The Chiral Smectic C phase as a typical ferroelectric liquid crystal has a layer structure. In case the liquid crystal layer is thick, the molecules take a spiral stucture in a normal line direction to the layer. But in case the liquid crystal layer is thin, the spiral is loosened and thus several conditions become stable in which the molecules are uniformly directed in one direction due to the interaction with a substrate surface. An electric field allows switching between these conditions, and as this switch shows an abrupt threshold, the matrix drive is feasible. As the stable conditions, there are two uniform states in each of which spontaneous polarizations are uniformly oriented in the direction of the electric field, and as another state, there is a twist state in which the directions of the spontaneous polarizations are opposite at opposite surfaces and has a twisted structure of liquid crystal molecules therebetween. In the uniform state, liquid crystal molecules are nearly parallel with the substrate surface and oriented in different directions by 2 times the inclined angle from the normal line to the liquid crystal layer depending upon the direction of the electric field. Sandwiching a cell between two polarizers which are arranged orthogonally to each other and also aligning the polarization axis to the molecule direction of one of the two uniform states provide two display states of brightness and darkness between the uniform states. The twist state is induced by an intermediate voltage of the voltage necessary to switch between the two uniform states, and it becomes a gray indication in the about arrangement of the polarizers. (N. A. Clark, S. T. Largerwall, "Submicro second bistable electrooptic switching in liquid crystals", Applied Physics Letters, Vol. 36 (11), pp. 899–901, Jun. 1, 1980).

The stability of these stable conditions depends on the polarities of the upper and lower substrates, and the initial molecular orientations immediately after the ferroelectric liquid crystal was sandwiched in a symmetrically structured cell contain two uniform states in a mixed mode or take a twist state. So far the liquid crystal condition outside the pixel has been considered that it is kept as the initial molecular orientation and is not responsive to the electrical field.

In case of the ferroelectic liquid crystal, it was reported that the orientated domain is easily expandable in a two dimension but the expansion due to the move of the domain wall will be as large as about 1 $\mu$m. (N. A. Clark, S. T. Lagerwall: "Structures and Applications of SSFLC Devices", Digest of JAPAN DISPLAY'86, pp456). Therefore, since the contrast can not be raised when a bright area display is present in the gap between pixels even if brightness and darkness is provided by controlling the voltage in the pixel area, a light shielding layer, namely, a black matrix layer, in the gap between pixels is normally formed in order to improve the contrastratio. Especially when a pixel pitch becomes smaller, several 10 $\mu$m, a light shielding layer is essential in order to obtain an indication of better contrast because an opening ratio (a ratio of the pixel area to the whole display area) becomes smaller.

However, when the pixel pattern becomes smaller, it becomes difficult to form a light shielding layer precisely between the pixels and the cost thereof becomes higher. In addition, as it is necessary to make the width of the light shielding layer larger than the gap between pixels by considering the margin for processing, the opening ratio becomes smaller to result in image a dark indication. (T. Leroux et al., "BLACK AND WHITE FLC TV PANEL WITH GREY LEVELS", CONFERENCE RECORD of 1988 INTERNATIONAL DISPLAY RESEARCH CONFERENCES, pp111, 1988), (Matsumoto et al.: "Large-Area Video-rate Multicolor Ferroelectric Liquid-Crystal Display", SID 88 DIGEST, pp41–44)

As a means other than the light shielding layer formation, it is proposed to darken the gap between pixels at the initial molecular orientation by first making the polarities of the alignment layers different from each other on the upper and the lower substrates to enhance the stability of one of the two uniform states. (for instance, Japanese Patent publication 63-225224, Japanese Patent publication 63-228130). However, with this method, such an unfavorable influence is apt to occur that molecules are liable to respond to cross-talk at multiplex driving due to the drop of stability of the other uniform state to cause reduction of contrast and change in memory state. In addition, it is difficult in the forming technique to change the kind of the base of the light shielding layer or the light shielding layer itself at only the gap between pixels.

There have been such problems as mentioned above to obtain a high contrast image on a ferroelectric liquid crystal panel, especially on a panel having fine pixel patterns.

Further, there is a problem of difficulty to make a multi-gray scale because the ferroelectric liquid crystal can have only limited stable states. An intermediate state between the two uniform states becomes a white/black spotted pattern or a twisted state, thus exhibiting an intermediate gray scale condition. But, extremely high niformity of the liquid crystal panel is reguired to realize, a uniform intermediate gray scale image. Therefore, conventional surface-stabilized ferroelectric liquid crystal provides gray scale with a bi-level display by scanning plural pixels plural times. (T. Leroux et al., "BLACK AND WHITE FLC TV PANEL WITH GREY LEVELS", CONFERENCE RECORD of 1988 INTERNATIONAL DISPLAY RESEARCH CONFERENCES, pp111–113, 1988). However, since the use of plural pixels to indicate the gray scale level will increase the number of electrodes, the electrode pattern will become finer and the number of driving circuits will also increase, thus leading to increase in cost.

SUMMARY OF THE INVENTION

By considering the problems above, an object of the present invention is to provide a ferroelectric liquid crystal display device and its driving method that allow a high contrast and bright display with a simple configuration and yet a uniform gray scale without increasing the number of electrodes.

In order to achieve the above object, the present invention provides a liquid crystal display device comprising a liquid crystal panel in which a ferroelectric liquid crystal is sandwiched between opposing substrates each having formed thereon a plurality of electrodes of form a plurality of pixels, and a means for applying predetermined voltages to adjacent pixels for switching a stable state of a gap between the adjacent pixels.

BRIEF DESCRIPTION OF THE DRAWINGS

FIG. 5 and FIG. 6 show driving waveform charts of a liquid crystal display device of the first embodiment of the present invention;

DESCRIPTION OF THE PREFERRED EMBODIMENTS

Embodiment 1

Figure 1:
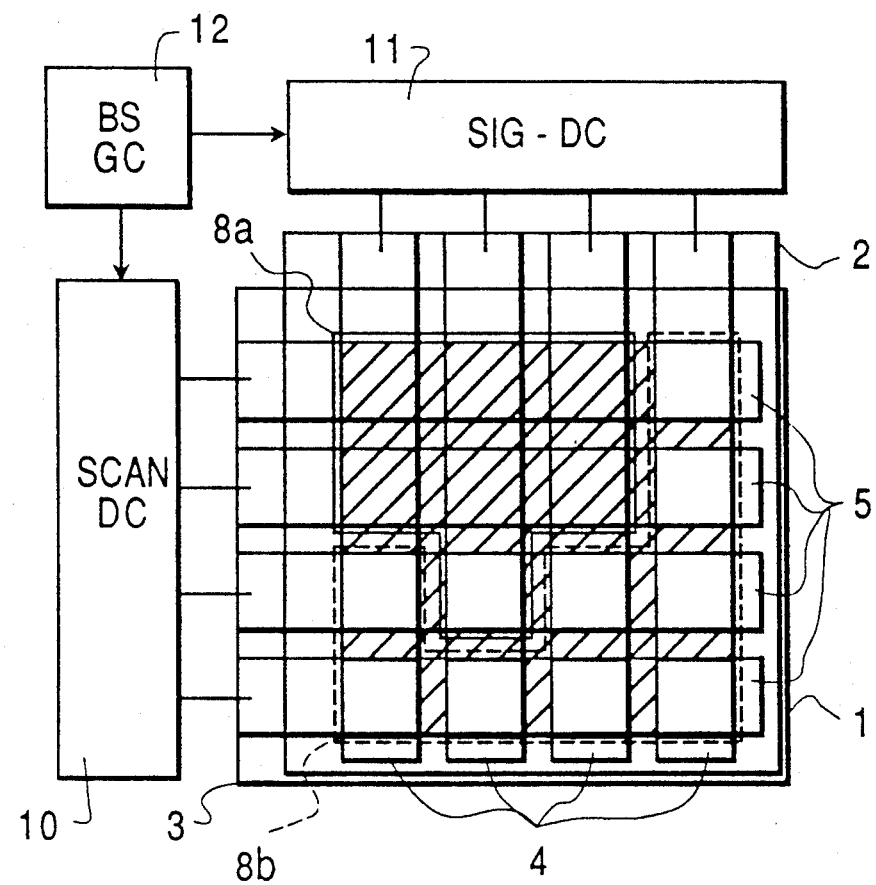
FIG. 1 and FIG. 2 show a plan view and a section view of a liquid crystal display device of the first embodiment of the present invention, respectively.
Figure 2:
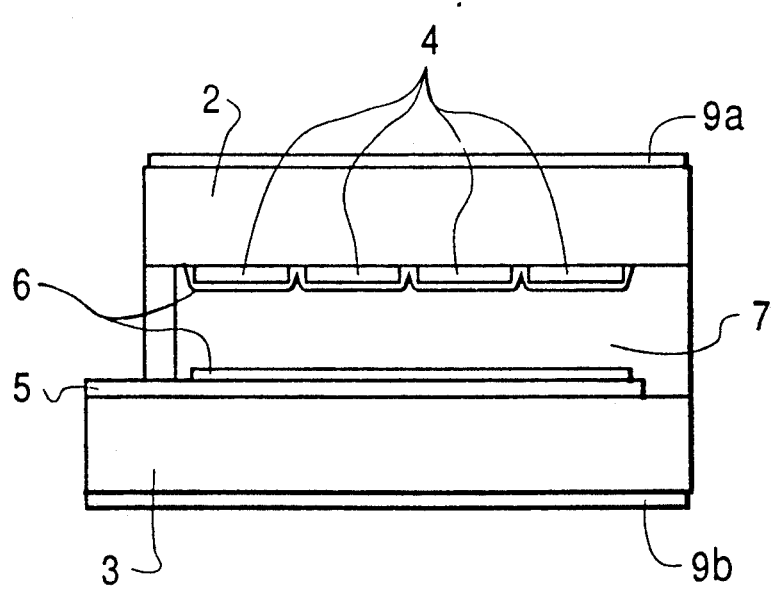
Figure 3:
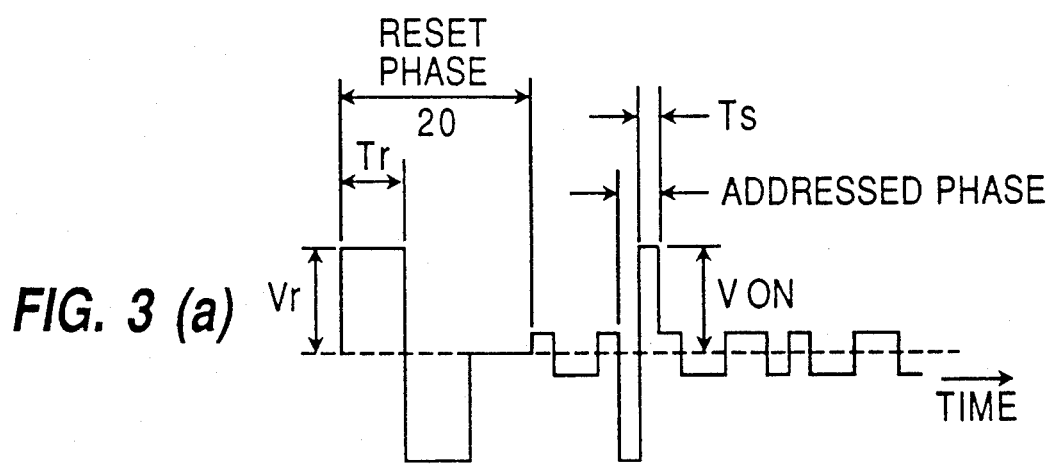
FIG. 3 shows a driving waveform chart of a liquid crystal display device of the first embodiment of the present invention.
Figure 3:
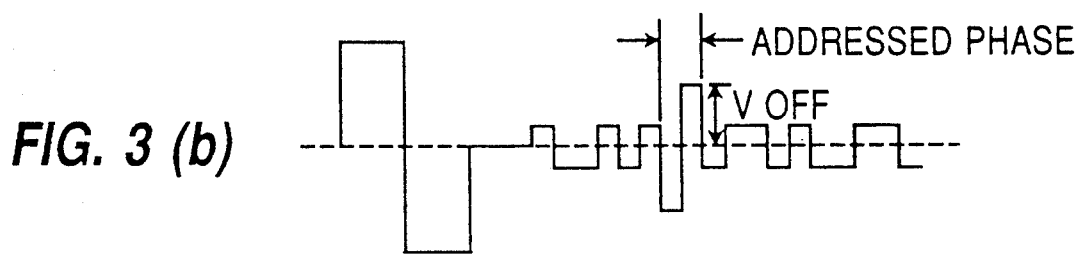

FIG. is a plan view of a liquid crystal display device of the present invention and is comprised by a liquid crystal panel 1 and driving circuits 10-12. In the liquid crystal panel a ferroelectric liquid crystal is sandwiched between an upper substrate 2 having signal electrodes 4 and a lower substrate 3 having scanning electrodes 5. Pixel pitch is 90 μm while gap between pixels is 5 μm. FIG. 2 shows a section views of liquid crystal panel 1, in which each pattern of stripe-shaped transparent electrodes 4 and 5 is formed on a glass and an alignment layer 6 is formed on each electrode pattern. The liquid crystal may be an ester ferroelectric liquid crystal. The thickness of liquid crystal layer 7 is 2.0 μm. Alignment layer 6 is formed by depositing SiO in a direction inclined by 82° from the substrate normal line. The bright and shade pattern is displayed with a birefringence effect by pasting polarizers 9a and 9b in a right angle to each other on the upper and lower substrates. A driving circuit part is composed of a scanning electrode driving circuit (SCAN-DC) 10, a signal electrode driving circuit 11 (SIG-DC), and a base signal generating circuit 12 (BSGC). With these circuits, the driving waveform as shown in FIG. 3 is applied to each pixel of liquid crystal panel 1. The display state after the driving waveform is applied to each pixel is shown in FIG. 1 such that a dark area in liquid crystal panel is illustrated with hatching lines while a bright area is illustrated with blank white. The pixels inside 8a encircled by a solid line are applied with an ON signal while the pixels inside 8b encircled by a broken line are applied with an OFF signal. FIG. 3 (a) shows a voltage to be applied to an ON pixel connected to a certain scanning electrode, and FIG. 3 (b) a voltage to an OFF pixel connected to the following scanning electrode. Scanning by a voltage selection scheme is carried out after making the whole panel dark condition at reset phase 20. When a bipolar pulse having Vr=25 volt and Tr=1 millisecond at the part of reset phase 20 in FIG. 3 is applied over the whole panel, the liquid crystal in the panel being at a twist condition at the initial molecular orientation become a stable uniform stste with a jet black including a gap area between the pixels. When the pulse of reset phase Vr=25 volt, Tr=less than 1 millisecond and more than 500 microsecond, was applied only the gap between pixels connected to the signal electrodes becomes daek. The gap does not respond to the reset pulse of Tr less than 500 microsecond. The 8b area in FIG. 1 is applied with a bipolar pulse of Ts=200 microsecond and Von=25 volt in an addressed phase as shown in FIG. 3(a) to invert only the pixel part to a bright condition while the area of 8a was applied with a bipolar pulse at Ts=200 microsecond and Voff=15 volt as shown in FIG. 3(b) in an addressed phase to keep the dark condition. If the polarity of the voltage to be applied to the pixels is completely reversed from the condition shown in FIGS. 3(a) and (b), the pixel condition will be completely reversed, i.e. the hatched area becomes a bright condition while the blank white area become dark. In this manner, the gap area shows bipolar stability in the same manner as in the pixel area.

When a second panel is used in which the pixel pitch is 30 μm and the gap pitch is 3 μm, the voltage and pulse width at which a stable condition of the gap is changed becomes smaller. For example, the gap area changes to the dark condition by application of Vr=25 volts and Tr=300 micro-second of bipolar pulse. In the second panel, the ON pixel in area 8b in FIG. 1 becomes a bright condition and the liquid crystal at the gap between the ON pixels takes a twisted condition to be a medium level. The area 8a remains in the same condition as FIG. 1.

The threshold voltage at the gap between pixels in a third panel with a pixel pitch 6 μm and a gap between pixels 2 μm becomes further smaller, and a dark condition can be obtained at Vr=25 volts and Tr=250 μsec.

Figure 4:
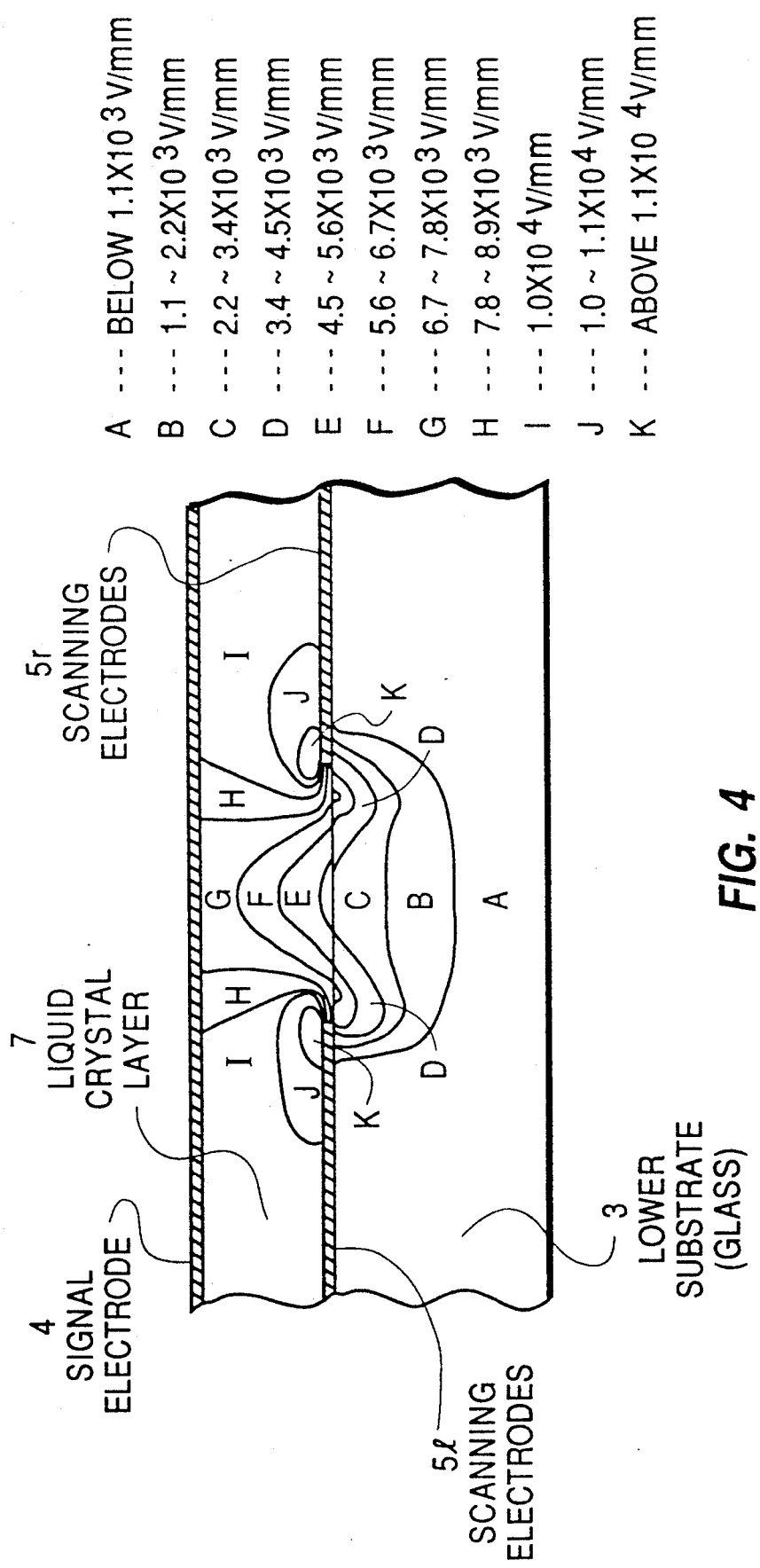
FIG. 4 shows a section view of a liquid crystal panel showing an electric field strength distribution of the first embodiment of the present invention.

The threshold value at the pixel area in the third panel is a little raised at 25 volts and 225 μsec and a difference from that at the gap becomes very small. Driving the third panel with Ts=250 μs, Von=2 volts which is little longer pulse than the threshold value, the gap between ON pixels becomes a bright condition while the gap between OFF pixels becomes a dark condition, and the gap between an ON pixel and an OFF pixel becomes a twisted condition. In consequence, the opening ratio of the pixel formed by a transparent electrode is 44% at 16 μm²/36 μm², but the brightness of characters and figures displayed is the same as the case with the opening ratio at 100%. FIG. 4 shows a section view of a liquid crystal shown with a distribution of electric field strength calculated with a finite element method to know what electric field is applied to the liquid crystal layer around the gap between pixels when applying a voltage to the whole panel. Calculation was made in such a manner that voltage of signal electrode 4 (hatching area) is 0 volt, voltage of scanning electrode 5l and 5r (hatching area) is 20 volt, thickness of liquid crystal layer 2 μm, thickness of electrode 4, 5l, and 5r, is of 200 nm, dielectric constants of liquid crystal layer 7 and lower substrate (glass) 3 are 7 and 6.7 respectively, the gap between scanning electrode 5l and 5r is 4 μm. In accordance with electric field strength, the inside of the panel was divided into areas A to K. The electric field strengths at the respective areas are shown in the figure. The area A corresponds to the weakest electric field strength while the area K corresponds to the strongest electric field strength. As is known in FIG. 4, 70% (area G: $6.7$-$7.8 \times 10$ V/mm) of the electric field on the pixel (area I: $1.0 \times 10^4$ V/mm) at the vicinity of signal electrode 4 is applied to the gap of scanning electrode 5, and even at the vicinity of the lower substrate 40 to 50% of electrical field strength (area E: $4.5$-$5.6 \times 10^3$ V/mm) is applied. With the same calculation, it has become clear that narrowing the gap between pixels allows the electrical field strength to be stronger while widening the gap between pixels to be weaker in the electrical field strength. Therefore, it is also known from FIG. 4 that narrowing the gap between electrodes will have the electrical field strength applied over the gap of electrical field strength that the liquid crystal can sufficiently respond to and the liquid crystal molecule responds to this electrical field strength. Also, by setting the electrode 5r at 15 volt, electrode 5l at 0 volt, and electrode 4 at 20 volt, it has known that, when only electrode 5l is selected, the electric field applied to the gap is lower than that when both 5l and 5r are selected. That is, simultaneously selecting the pixels adjacent to each other makes it easy for the gap to respond to rather than selecting only one pixel. The voltage and pulse width necessary for switching the stable state of the electrode gap also depends on volume resistivity of the liquid crystal material. In case of using the liquid crystal of volume resistivity of $5 \times 10^{10}$ Ω/cm or more, the cell with less than 30 μm of the gap can be made a black matrix condition in the driving wave form in FIG. 3 by increasing the voltage or widening the pulse width. However, in case of ferroelectric liquid crystal material having large amount of ionic impurity with $10^{10}$ Ω/cm or less of volume resistivity in the liquid crystal layer, even if the pulse width is lengthened, it could not make the gap completely dark in case the gap between pixels is 5 μm or more. This is so considered that the ionic impurities move due to the applied voltage, and then a voltage reverse to the applied voltage is generated because of ion distribution.

In this case, as seen in reset phase 30 in FIG. 5, by shortening the pulse width of the bipolar pulse and inserting relaxation time Tp to relax the biased ion with several times the repetition thereof, it has become clear that even the short pulse allows the gap to be moved with the repetitive effect by protecting the ion from movement. The pulse width Tr of the reset pulse in this case is most appropriate when it is 2 to 20 times the pulse width Ts of the pulse of the addressed phase, and relaxation time Tp is most appropriate when it is about 1 to 5 times the Tr. After the reset phase, selecting the pixel by means of a voltage selection schemes in the same way as in FIG. 3 can lead to a black matrix which makes the gap a stable dark condition. Although scanning with the driving waveform in FIG. 3 or 5 were made after the whole panel was made into a dark condition, it is acceptable to apply the bipolar pulse to the pixels on consecutive plural scanning electrodes in turn instead of the whole panel or to a part of the panel, because the gap between pixels is easily responsive if an electrical field having almost the same voltage is applied to the adjacent electrodes.

Figure 6:
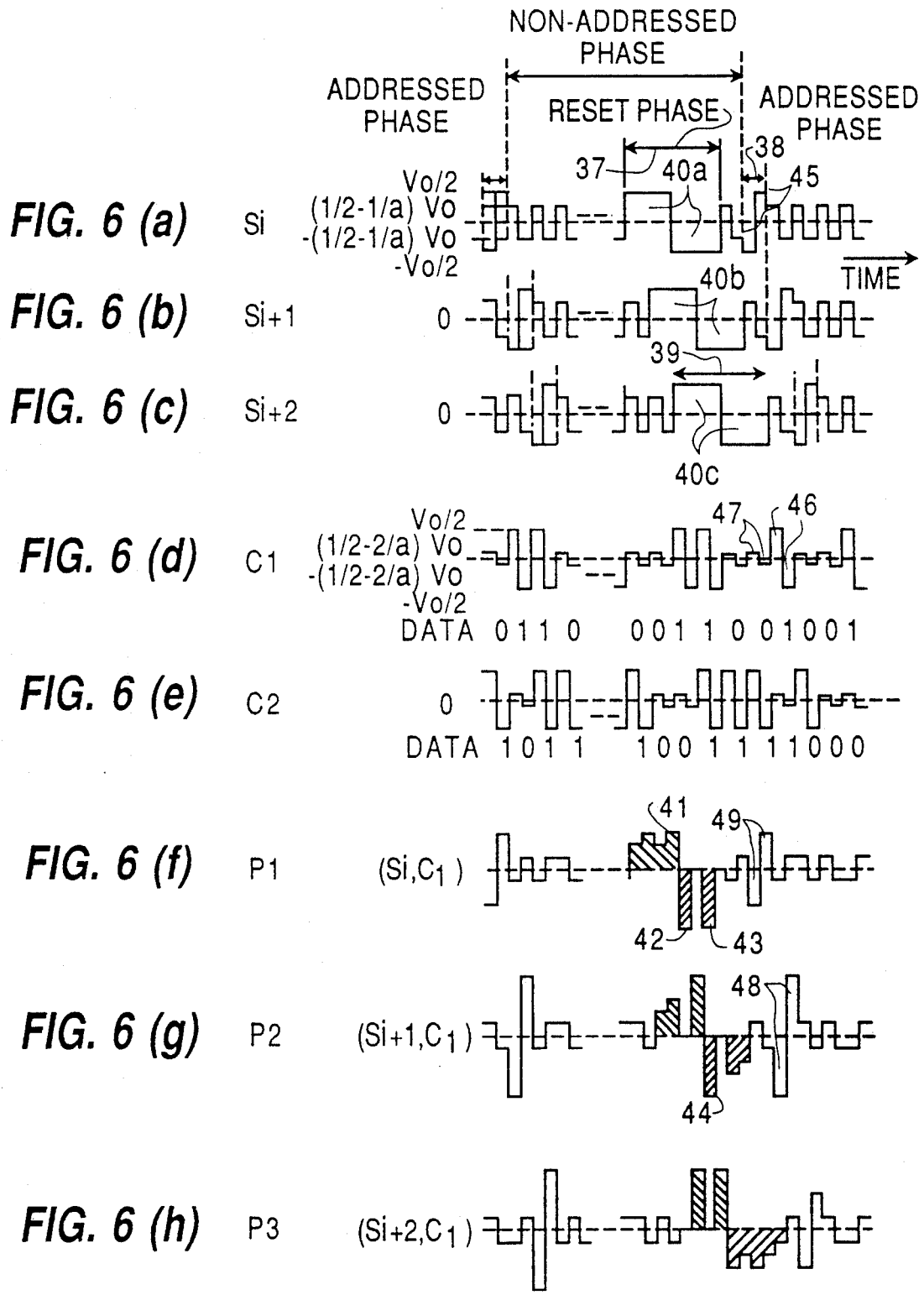

A method to insert a reset phase when another scanning line is selected as shown in FIG. 6 allows a continuous scanning to be made. In FIG. 6, (a), (b) and (c) are voltages to be applied to scanning electrodes $S_i$, $S_{i+1}$ and $S_{i+2}$, (d) and (e) are voltages to be applied to any signal electrodes $C_1$ and $C_2$, and (f), (g) and (h) are voltages to be applied to pixels P1(Si, C1), P2($S_{i+1}$, C1) and P3($S_{i+2}$, C1). The applied voltages of the non-addressed phase other than the addressed phase and reset phase are the same as those of the voltage selection scheme. That is, to the scanning electrode, pulse 45 at voltage $\mp V_0/2$ in addressed phase is applied, to the signal electrode pulse 46 at voltage $\pm V_0/2$ in case data being 1, and in case data being 0 pulse 47 at voltage $\pm(\frac{1}{2}-2/a)V_0$ is applied. Here, 1/a is a bias ratio which is an appropriate real number from 3 to 6 set in accordance with the threshold of the liquid crystal. Then, pulse voltage 48 of $\mp V_0$ is applied to a pixel when data is 1 in the addressed phase, and when data is 0 AC pulse 49 of $\mp(1-2/a)V_0$ is applied to a pixel. In the non-addressed phase other than the reset phase, AC pulse of voltage $V_0/a$ is applied to a pixel by applying the voltage of $\pm(\frac{1}{2}-1/a)V_0$ to a scanning electrode. For reset phase 37, AC pulse 40a, at voltage of $\pm V_0/2$ with wide pulse width which is reverse to pulse 45 in polarity of the addressed phase, is applied to the scanning electrode prior to addressed phase 38. A certain reset phase of a scanning line is overlapped with an addressed phase of other scanning lines. For example, reset phase 39 in FIG. 6 $S_{i+2}$ is overlapped with addressed phase 38 of $S_i$. Therefore, in reset phase 39 of $S_{i+2}$ data of pixels on the scanning line other than $S_{i+2}$ is inputted to signal electrodes C1 and C2. But, since the pulse width of each of pulses 40a, 40b and 40c in the reset phase is sufficiently long, even if the synchronizing signal voltages are of ON signal or OFF signal, bipolar pulses having longer pulse width like the one as hatched area in FIG. 6 (f) to (G) are artificially applied to the pixels and allow the gap between pixels to be electrically field responsive. For example, reset pulses 42 and 43 are separated, a repetitive effect provides the same effect as the pulse having a longer pulse width. Also, as the reset pulses, i.e., reset pulses 43 and 44 to P1 and P2, are simultaneously applied to the adjacent pixels, gaps are easily made responsible.

Since all of the pulses such as 40a, 40b and 40c of the reset phase and signal voltages C1 and C2 are AC (alternating current) signals, the reset pulses to be applied to the pixels do not also contain DC (direct current) components. For example, the positive area (voltage x pulse width) of reset pulse 41 of FIG. 6 (f) comes to;

$$[\{V_0/2-(\tfrac{1}{2}-2/a)V_0\}-\{V_0/2-(\tfrac{1}{2}-2/a)V_0)\}] \cdot 2 = 2V_0$$

and the total negative area of reset pulses 42 and 43, comes to;

$$[\{-V_0/2-V_0/2\}-\{-V_0/2-(-V_0/2)\}] \cdot 2 = -2 \cdot V_0.$$

thus positive and negative pulse areas are equal. Therefore, there is no possibility that an electrochemical reaction may invite any deterioration of the liquid crystal. The use of the driving method in FIG. 6 allows the reset pulse to be applied at time during scanning, at any pulse width, and at any numbers of time, therefore, for instance, such a driving waveform as shown in FIG. 6 is able to switch a stable condition of a gap between pixels, even if it is of a panel with a large amount of ionic impurities, by a continuous scanning within a short scanning time.

Figure 7:
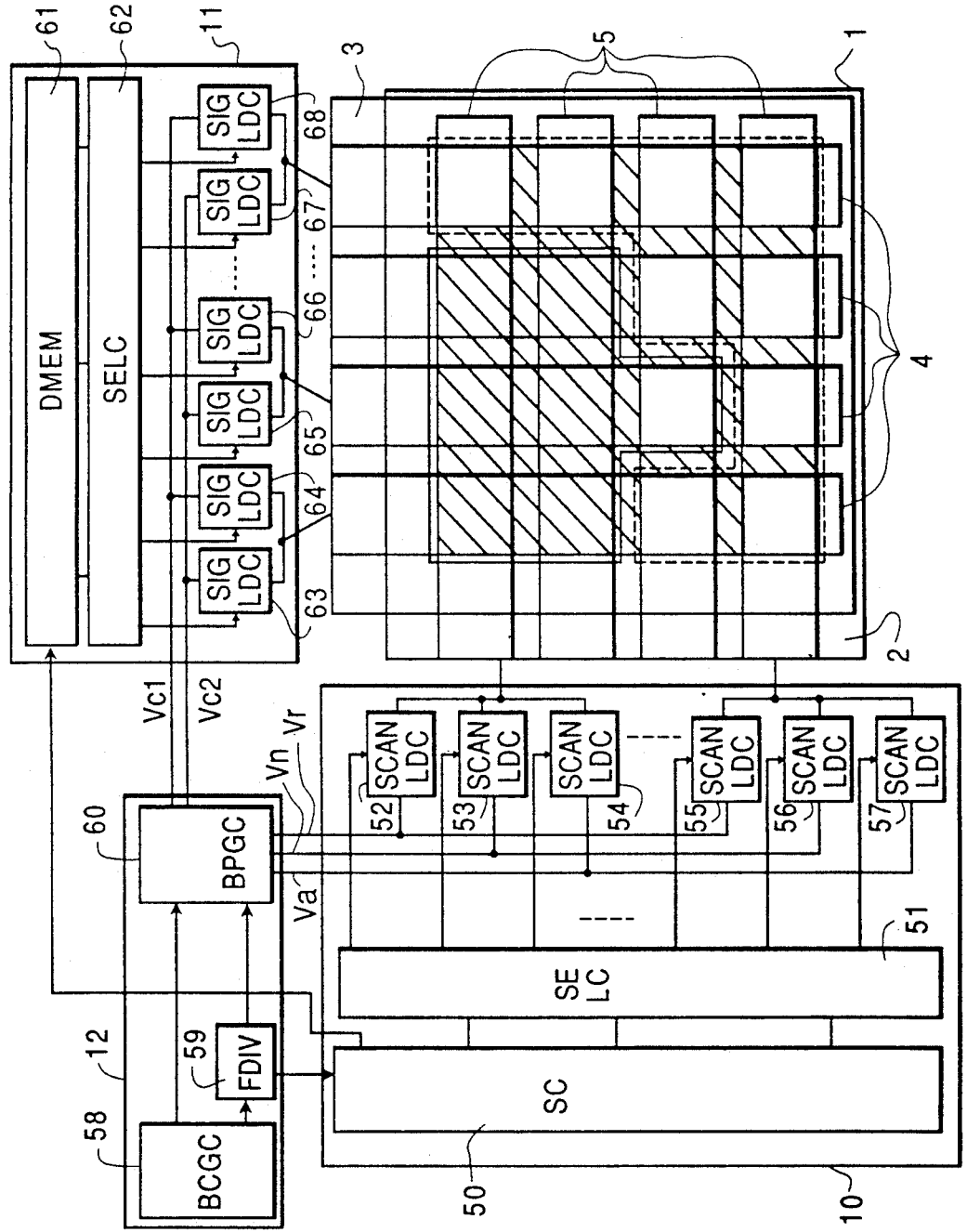
FIG. 7 shows a block diagram of a driving circuit of a liquid crystal display device of the first embodiment of the present invention.

Detailed block diagrams for driving circuits 10, 11 and 12 in FIG. 1 are shown in FIG. 7. These circuits allow the driving waveforms in FIG. 3, FIG. 5 and FIG. 6 to be implemented. The clock pulse obtained by base clock generating circuit (BCGC) 58 and frequency-divider (FDIV) 59 switches analog switches in the base pulse voltage generating circuit (BPGC) 60. This will cause addressing scanning voltage Va, non-addressing scanning voltage Vn, and reset scanning voltage Vr to be generated. Scanning circuit (SC) 50 and selection circuit (SELC) 51 sends a selection pulse, which selects in turn a scanning electrode, to scanning line driver circuits (SCANLDC) 52-57 by receiving the clock pulse from FDIV 59. SCANLDC 52-57 select a scanning voltage generated in BPGC60 in accordance with the selection pulse. Meanwhile, signal line drive circuits (SIGLDC) 63-68 selects a signal voltage from BPGC 60 in accordance with selection pulses Vc1 and Vc2 generated by selection circuit 62 according to data sent from display memory (DMEM) 61.

As mentioned above, the liquid crystal display device of the present invention implements a light valve with high contrast ratio and high transmittance (reflectance in case of reflection type) by means of a simple configuration without light shielding layer in the gap between pixels, even if the pattern is very fine and the opening ratio cannot be large enough.

Although an alignment layer is formed by means of oblique evaporation in the present embodiment, even an alignment layer rubbed with organic polymer and an organic polymer thin layer formed by means of Langmuir-blodgett method can give the same effect. In the cell having at least $3 \times 10^{10} \cdot \Omega cm$ of resistance of liquid crystal material, an opening ratio of 100% can be displayed by switching stable conditions of both gap and pixel, even if the width of the gap is 5 μm.

In case the gap between pixels is narrow, as the pixels adjacent to each other in a bright or dark condition is expandedly displayed, the liquid crystal display device of the present invention is effective as a photomask to be used for making semiconductor integrated circuits, etc. In using the liquid crystal display device of the present invention, merely sending out data to a liquid crystal drive circuit serves as photomasking instead of making fixed pattern by etching shielding layer like chrome and the like.

Furthermore, in case a pixel pitch of the liquid crystal display device of the present invention is a pattern of at most several 10 μm, a display device having a large, high precision/high capacity, bright, and high contrast is structured by projecting the pattern onto a screen on a large scale.

Embodiment 2

Figure 8:
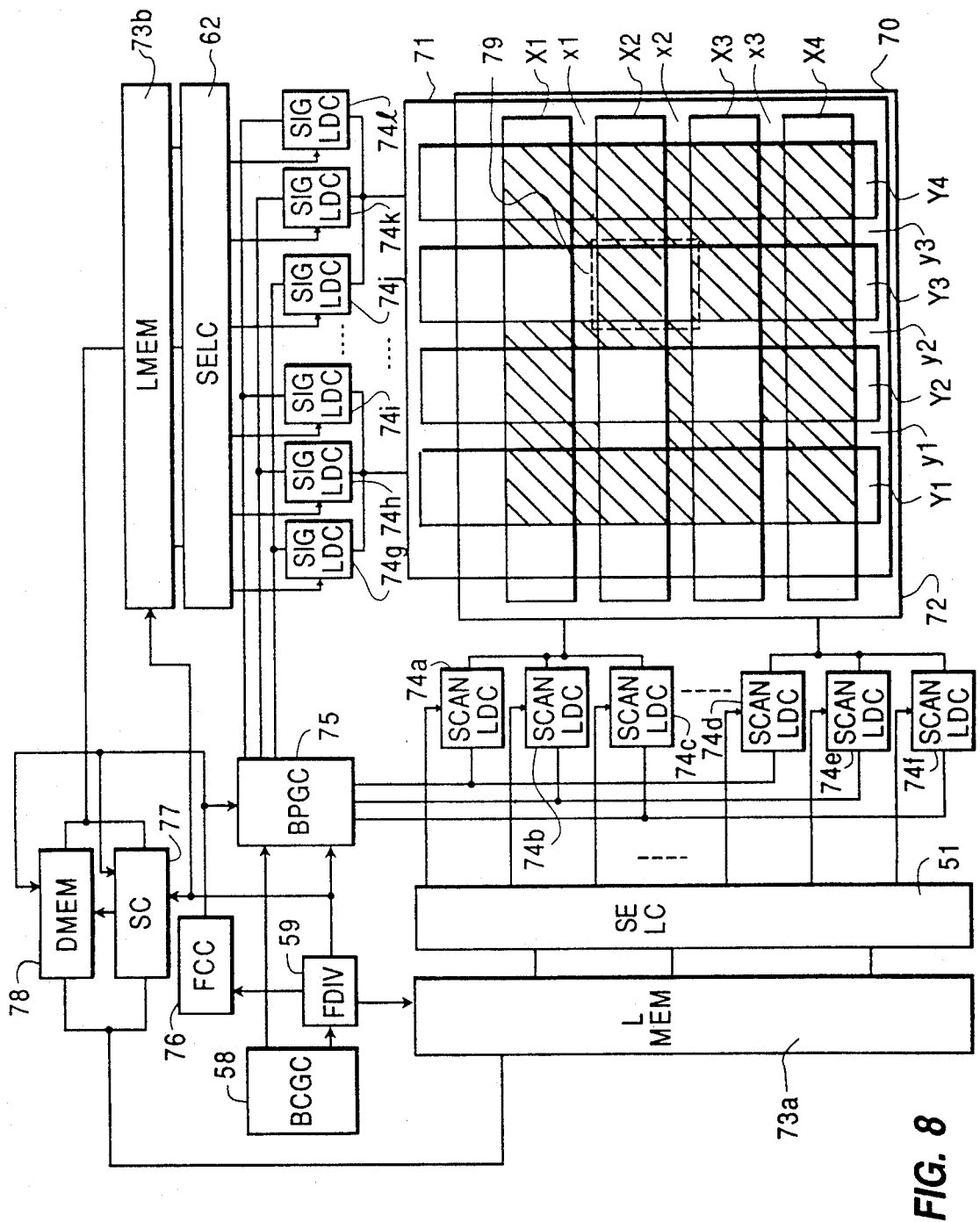
FIG. 8 shows a plan view of a liquid crystal display device of the second embodiment of the present invention and a block diagram of a driving circuit.

FIG. 8 shows a block diagram of a driving circuit and a plan view of a liquid crystal display device equipped with a driving circuit and a ferroelectric liquid crystal matrix panel 70 in which a pixel pitch is 24 μm, and each vertical gap consisting of y1 to y3 is 4 μm located between column electrodes Y1 to Y4 on the upper substrate 71, and each horizontal gap consisting of x1 to x3 is 8 μm located between row electrodes X1 to X4 on the lower substrate 72. Liquid crystal panel 70 forms a transparent electrode of a stripe shape on the grass in the same manner as shown in FIG. 2 of the embodiment 1, and an alignment layer is formed thereon and has no light shielding layer on the gap. The liquid crystal material, thickness of the liquid crystal layer, and a forming method for alignment layer are the same as those of embodiment 1.

Figure 10:
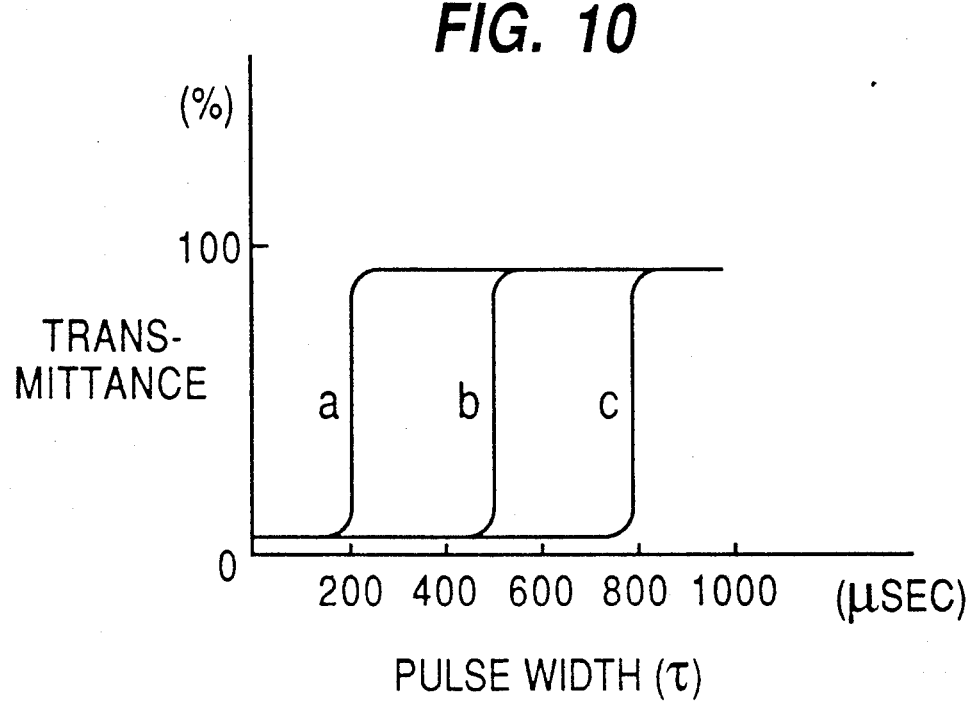
FIG. 10 and FIG. 11 each show a characteristic diagram of a liquid crystal display device of the second embodiment of the present invention.
Figure 11:
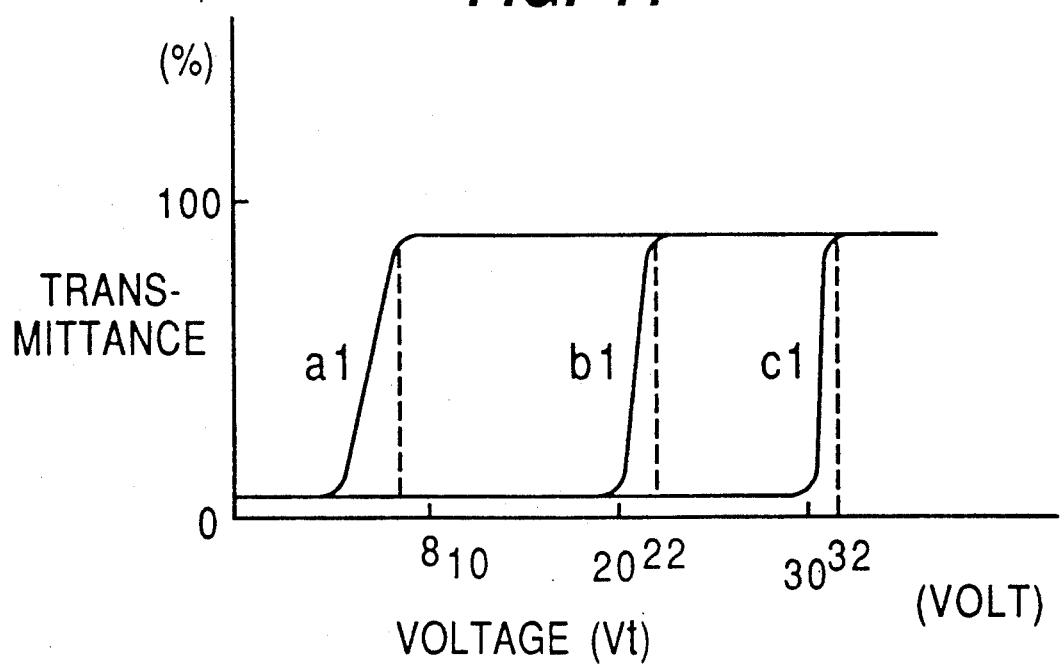
Figure 12:
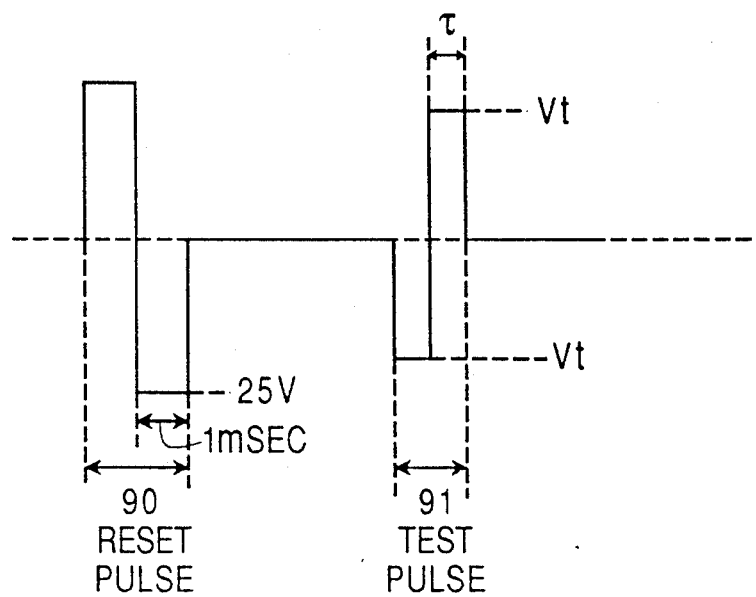
FIG. 12 shows a waveform chart of an applied voltage at the time of characteristic measurement.
Figure 13:
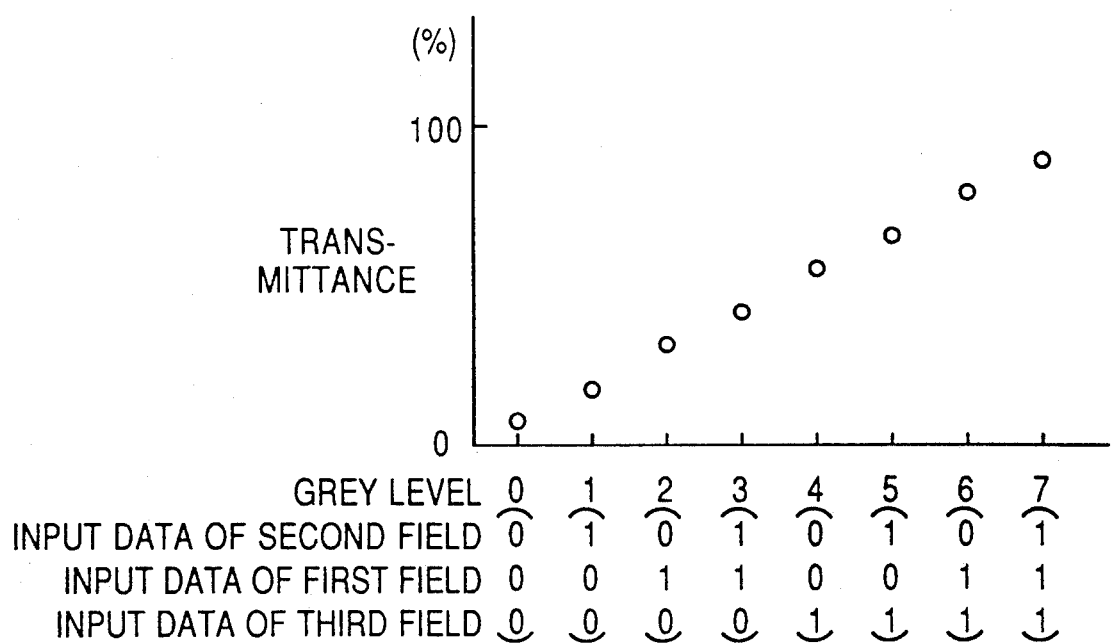
FIG. 13 shows a correlation chart between input data and brightness of a liquid crystal display device of the second embodiment of the present invention.

FIGS. 10 and 11 are characteristic diagrams measured for a light transmittance to a pulse width of applied voltage, and a light transmittance to a applied voltage in liquid crystal panel 70 in FIG. 8. The method of measurement is made by measuring a light transmittance when the memory condition of the pixels are stabled, after the voltage is applied to all of the pixels as shown in FIG. 12. The voltage wave form in FIG. 12 is formed by applying bipolar test pulse 91 at pulse width τ and voltage Vt, after making the whole panel completely dark with reset pulse 90 at 25 volts and pulse width 1 millisecond. In FIG. 10, a, b and c show respectively characteristic curves measured of pixel (X1, Y1), gap (X1, y3) and (x1, Y3) between pixels in the unit pixel as enclosed by a dotted line when pulse width of pulse 91 is changed while the voltage is fixed. In FIG. 10, a, b and c, there are respective transmittance rises with switchover in stability at 200 microsec, 500 microsec, and 800 microsec, respectively. FIG. 11 a1, b1, and c1 show a transmittance characteristic curve to the voltage applied to pixel (X1, Y3), gap (X1, y3) and (x1, Y3) when τ is fixed at 500 microsec, and respective threshold voltages 0 to about 8 volts, 22 volts, and 32 volts. In this way, these gaps between pixels likewise showed bistability like the pixel inside, and it has become clear that the wider the gap, the bigger the threshold voltage. However, when voltage is applied to only one electrode without making short-circuiting the adjacent electrodes, even a pulse of 25 volt at 1 millisecond does not allow the stability of the gap between pixels to be switched.

Figure 9:
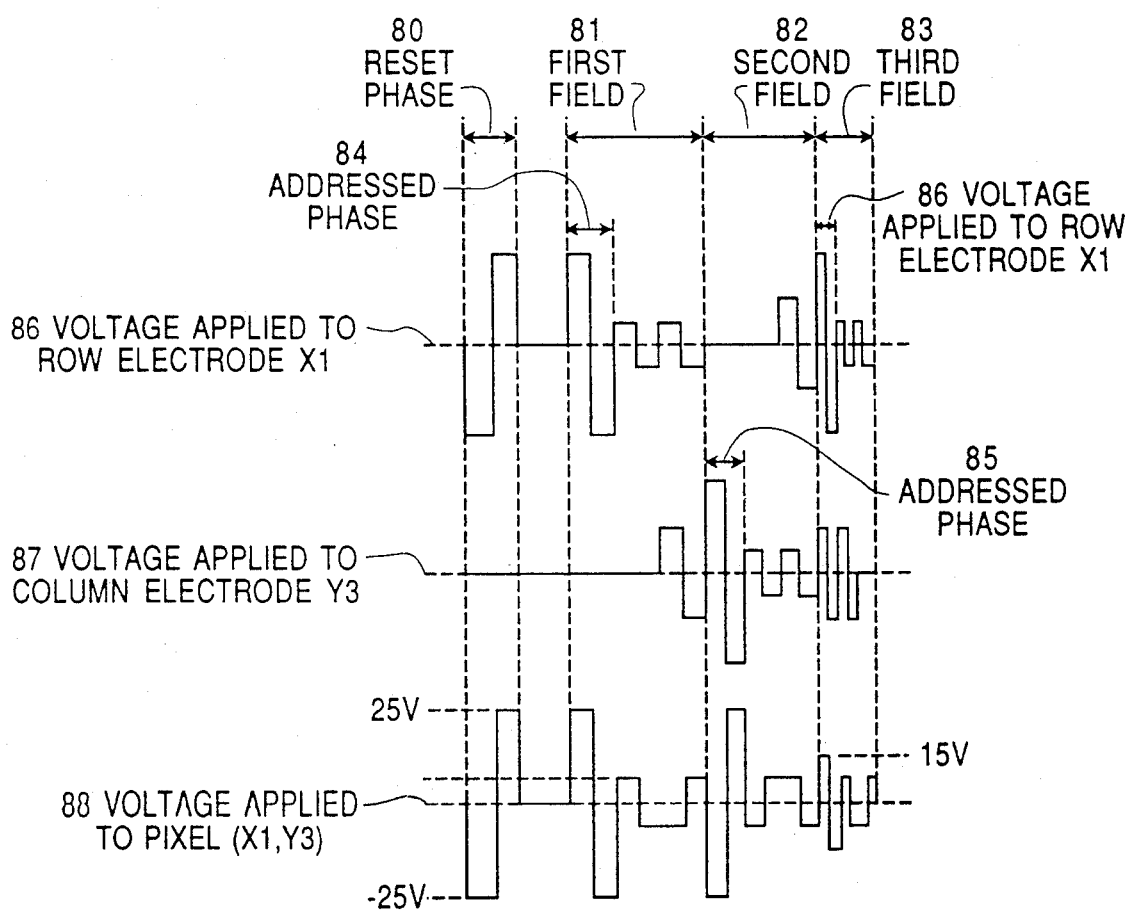
FIG. 9 shows a driving waveform chart of a liquid crystal display device of the second embodiment of the present invention.

In this connection, by utilizing this bistability of this gap between pixels, gray scale display is made by combining brightness inside the pixel and the gap between pixels by applying the driving waveform as shown in FIG. 9 to the liquid crystal panel. Namely, in FIG. 9, first of all making the whole panel black by applying reset pulses in reset phase 80 of 1 millisecond at ∓25 volts to entire pixels, bright and dark are written to the pixel and two kinds of gaps in turn from a portion having a longer threshold pulse width with 3 times scanning from 81 to 83. In the driving waveform in FIG. 9, 86 is a voltage to be applied to row electrode X1 in FIG. 8, 87 is a voltage to be applied to column electrode Y3, 88 is a voltage to be applied to pixel (X1, Y3). With the first scanning 81, two adjacent row electrodes X1 and X2, at pulse width 800 microsecond are selected simultaneously. At that time, to column electrode Yi (i=1 to 3), a signal voltage corresponding to data (from 0 to 1) of the gap between pixels (x1, Yi) is applied. The bipolar pulse during addressed phase 84 is set at a reverse polarity to reset pulses in reset phase 80, and an ON voltage sufficient to reverse the brightness in the gap at data being 1 is given to the pixels while at an data being 0 an OFF voltage on which darkness is kept is applied to pixels. In this way gradual shifting by one scanning line will allow the data to be written into gap (xk, Yi) (k=1 to 3) between the row electrodes. When the first field 81 is finished, as the pixel and the gap between column electrodes have small threshold voltages, they are sure to be reversed to brightness. Then, as it is necessary to select simultaneously Yi and Yi+1 in order to write data into a gap between column electrodes, scanning direction is changed and the scanning voltage is applied to the column electrodes and the signal voltage to the row electrode. When scanning the second field 82 in the same manner as in the first with a pulse width at 500 microsecond, as the gap between row electrodes (xk, Yi) has higher threshold voltage, a condition at the first field 81 is kept, thus making it possible to write data into the gap (Xi, yi) alone. In this connection, as the polarity of the pulse to be applied to the pixel are already switched in a scanning direction, it is reversed to the first field 81, and pixels with lower threshold voltage (Xk, Yi) are all reversed from a bright condition to a dark condition. Then, by selecting the third field 83 by every one scanning line at a pulse width of 200 microsecond, dark and bright data can be written into the inside of the pixel by keeping the condition of the gaps as it was. The scanning direction at this time may run on row electrode although it runs on the column electrode in FIG. 9. Thus, writing brightness and darkness selectively the one pixel and two adjacent gaps, allows a 8-gray scale display to be made. The hatching area in liquid crystal panel 70 in FIG. 8 represents a part of darkness of the display obtained by such scannings. A correlation diagram of brightness in a respectively gray scale display and input data in 3-time each scannings. The horizontal axis represents input gray scale data of the second field 82, the first field 81, and the third field 83 in turn from an upper position inside the bracket. The axis of ordinates represents the transmittance of a unit pixel 79, but each gray scale is of almost the same equal interval as the ratio of an area in which bright and darkness are written in each of the first, second and third field is made to be nearly 4 to 2 to 1.

Explanation will follow of the driving circuit to implement the driving waveform in FIG. 9, by referring to the block diagram in FIG. 8. A flag output to show the scanning direction in accordance with the field number is outputted by counting the field number by field counting circuit (FCC) 76. By receiving flag signals from FCC 76, base pulse voltage generating circuit BPGC 75 switches an output direction of the scanning voltage and the signal voltage. The output signal of scanning circuit (SC) 77 and display memory 78 also switches an output direction in accordance with the flag signal of FCC 76. Namely, when scanning the row electrodes, the output of SC77 is outputted to line memory (LMEM) 73a and the output of DMEM78 is to line memory (LMEM) 73b. In accordance with scanning and signal data stored in the line memory, selection circuits (SELC) 51 and 62 send selection pulses to signal line driving circuits (SIGLDC) 74a–74l. SIGLDC 74a–74l select the voltage of BPGC 75 in accordance with the selection pulse.

Figure 14:
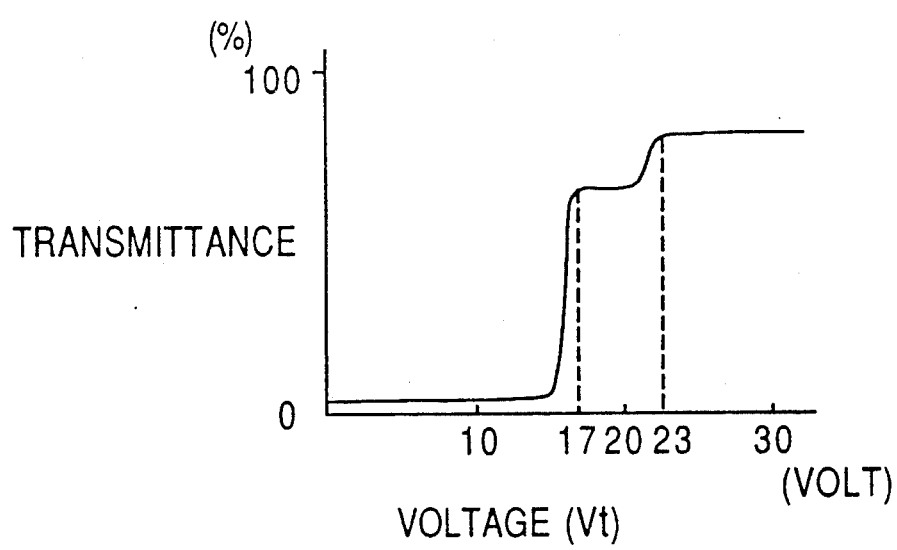
FIG. 14 shows a characteristic diagram of a liquid crystal display device of the third embodiment of the present invention.

Next, explanation will follow of the third embodiment. In the second embodiment write of display was made with plural times of scannings because the threshold voltages between the gap between pixels and the pixel inside differ largely, however, making the gap between pixels smaller will lead the difference between the threshold voltages to a smaller value. FIG. 14 represents a characteristic diagram of a light transmittance to an applied voltage of the ferroelectric liquid crystal panel by taking the gap between pixels of the signal electrode at pixel pitch 18 μm to be 2 μm and the gap between pixels of the scanning electrode to be 4 μm. Measurement was made with a wave form shown in FIG. 11 at a pulse width of 250 μs. The axis of abscissa represents voltage Vt of test pulse 91 while the axis of ordinate represents transmittance in case transmitted lights of both the pixel and the gap between pixels are added. The transmittance has increased to about 70% because only the pixel inverted from a dark condition to a bright condition at 17 volt. Then, the gap between pixels on the signal electrode inverted at about 23 volt, and the transmittance increased stepwise to about 80%. Therefore, in the driving waveforms as shown in FIG. 3, FIG. 5 and FIG. 6, when applying such selection voltages as ON voltage 25 volts, OFF voltage 15 volts, and intermediate voltage 20 volts to the pixels by driving at pulse width 250 μs, ON voltage 25 volts, and bias ratio ¼ in a selection period, only one time of scanning causes a 3-gray scale display to be provided. With the intermediate voltage, inside the pixel is stable in a bright condition while the gap is in a dark condition. Since the intermediate state is kept in voltage range from 17 volts to 21 volts, non-uniformity in the panel such as panel thickness hardly affects the gray scale uniformity. In this case, the driving circuit has the same configuration as the one in FIG. 7, and the aforementioned intermediate voltage is supplied from BPGC to the 3rd SIGLDC by increasing SIGLDC to 3 pieces per 1 electrode that are horizontally aligned.

As mentioned above, the liquid crystal display device of the present invention allows multi-gray scale display to be implemented with the same number of electrodes with the conventional ferroelectric liquid crystal display device by controlling the condition of the gap between pixels in case the pattern is very fine, with the application of voltage through pixel electrodes.

What is claimed is:

1. A liquid crystal display device comprising a liquid crystal panel in which a ferroelectric liquid crystal is sandwiched between upper and lower substrates each having a plurality of electrodes to form a plurality of pixels at intersection of said electrodes of said upper and lower substrates and means for applying a predetermined voltage to adjacent pixels in said plurality of pixels having a magnitude and pulse width which are sufficient to switch a stable condition of a gap at a non-intersection of said electroder of said upper and lower electrodes and between the adjacent pixels, wherein said predetermined voltage switches the stable condition of the gap to a dark condition when both of the adjacent pixels are set in a dark condition by said predetermined voltage, and to a bright condition or an intermediate condition when both of the adjacent pixels are set in a bright condition by said predetermined voltage.

2. A liquid crystal display device as set forth in claim 1, wherein the gap is less than 5 μm.

3. A liquid crystal display device as set forth in claim 2, wherein resistance of the ferroelectric liquid crystal is at least $3 \times 10^{10}$ ohm.cm.

4. A liquid crystal display device as set forth in claim 1, wherein the electrodes on the upper and lower substrates are arranged in rows and columns, respectively, to form a matrix, and said means applies a selecting voltage to both adjacent row electrodes and applies a voltage corresponding to an image data to a column electrode to thereby supply the predetermined voltage to adjacent pixels formed at intersections of said column electrode and said adjacent row electrodes, whereby a gap at a non-intersection of said column electrode and said adjacent row electrodes and between said adjacent pixels formed at said intersections is switched to a stable condition corresponding to said image data.

5. A liquid crystal display device comprising a liquid crystal panel in which a ferroelectric liquid crystal is sandwiched between upper and lower substrates each having a plurality of electrodes to form a plurality of pixels at intersection of said electrodes of said upper and lower substrates, and means for applying a predetermined voltage to adjacent pixels in said plurality of pixels, said voltage having a magnitude and pulse width which are sufficient to switch a stable condition of a gap at a non-intersection of said electrodes of said upper and lower electrodes and between the adjacent pixels, wherein the width of the gap is at most 30 μm, said means first applying the predetermined voltage for switching the stable condition of said gap and the adjacent pixels into a dark condition and then applying a selecting voltage for selecting the adjacent pixels and keeping the gap in the dark condition even.

6. A liquid crystal display device as set forth in claim 5, wherein orientation layers formed on the upper and the lower substrates have a same polarity.

7. A driving method for driving a liquid crystal device, in which a ferroelectric liquid crystal is sandwiched between upper and lower substrates each having a plurality of electrodes to form a plurality of pixels at intersections of said electrodes of said upper and lower substrates, wherein a predetermined voltage having a voltage magnitude and pulse width which are sufficient to switch a stable condition of a gap at a non-intersection of said electrodes of said upper and lower electrodes and between adjacent pixels in said plurality of pixels is supplied to said adjacent pixels wherein, after applying the predetermined voltage as a first voltage for stabilizing the gap in a dark condition to the adjacent pixels, a second voltage smaller in pulse width than the first voltage is supplied to respective pixels to select said respective pixels and to keep the stable condition of the gap.

8. A driving method as set forth in claim 7, wherein the first voltage is an AC pulse which has a larger pulse width than that of the second voltage, and is applied at intervals of 1 to 5 times the pulse width of said AC pulse.

9. A driving method for driving a liquid crystal device, in which a ferroelectric liquid crystal is sandwiched between upper and lower substrates each having a plurality of electrodes to form plurality of pixels at intersections of said electrodes of said upper and lower substrates, wherein a predetermined voltage having a voltage magnitude and pulse width which are sufficient to switch a stable condition of a gap at a non-intersection of said electrodes of said upper and lower electrodes and between adjacent pixels in said plurality of pixels is supplied to both of said adjacent pixels, and wherein the electrodes on the upper and lower substrates are arranged in rows and columns of a matrix, respectively, and wherein a first scanning is made by the predetermined voltage to select at least two adjacent row or column electrodes to control a stable condition of the gap, and then a second scanning is made by a voltage which is smaller in pulse width than the predetermined voltage for selecting the row or column electrodes one by one sequentially to control a stable condition of a selected pixel connected to the selected row or column electrode.

10. A driving method as set forth in claim 9, wherein the first scanning comprises a scanning of the row electrodes to control a stable condition of a gap between adjacent row electrodes, and a scanning of the column electrodes to control a stable condition of a gap between adjacent column electrodes.

11. A driving method for driving a liquid crystal device, in which a ferroelectric liquid crystal is sandwiched between upper and lower substrates each having a plurality of electrodes to form a plurality of pixels at intersection of said electrodes of said upper and lower substrates, wherein a predetermined voltage having a voltage magnitude and pulse width which are sufficient to switch a stable condition of a gap at a non-intersection of said electrodes of said upper and lower electrodes and between adjacent pixels in said plurality of pixels is supplied to both of said adjacent pixels, and wherein after resetting a pixel of said adjacent pixels and the gap between said adjacent pixels to either a bright or dark condition with the predetermined voltage, a scanning for selecting said pixel is made to keep the conditions of said pixel and said gap or invert only said pixel or invert both said pixel and said gap to thereby obtain 3 gray levels.

12. A driving method for driving a liquid crystal device, in which a ferroelectric liquid crystal is sandwiched between upper and lower substrates each having a plurality of electrodes to form a plurality of pixels at intersections of said electrodes of said upper and lower substrates, wherein a predetermined voltage having a voltage magnitude and pulse width which are sufficient to switch a stable condition of a gap at a non-intersection of said electrodes of said upper and lower electrodes and between adjacent pixels in said plurality of pixels is supplied to both of said adjacent pixels, and wherein the electrodes on the upper and lower substrates form scanning electrodes and signal electrodes, respectively, and wherein a scanning electrode connected to said adjacent pixels is supplied with a pulse voltage which has a pulse width at least twice that of a scanning pulse voltage supplied to said scanning electrode in an addressed phase and is opposite in polarity to a scanning pulse voltage when another scanning electrode is selected whereby said adjacent pixels are supplied with the predetermined voltage which is sufficient to switch the stable condition of the gap between said adjacent pixels regardless of a voltage supplied to the signal electrodes.

* * * * *